Patented May 26, 1942

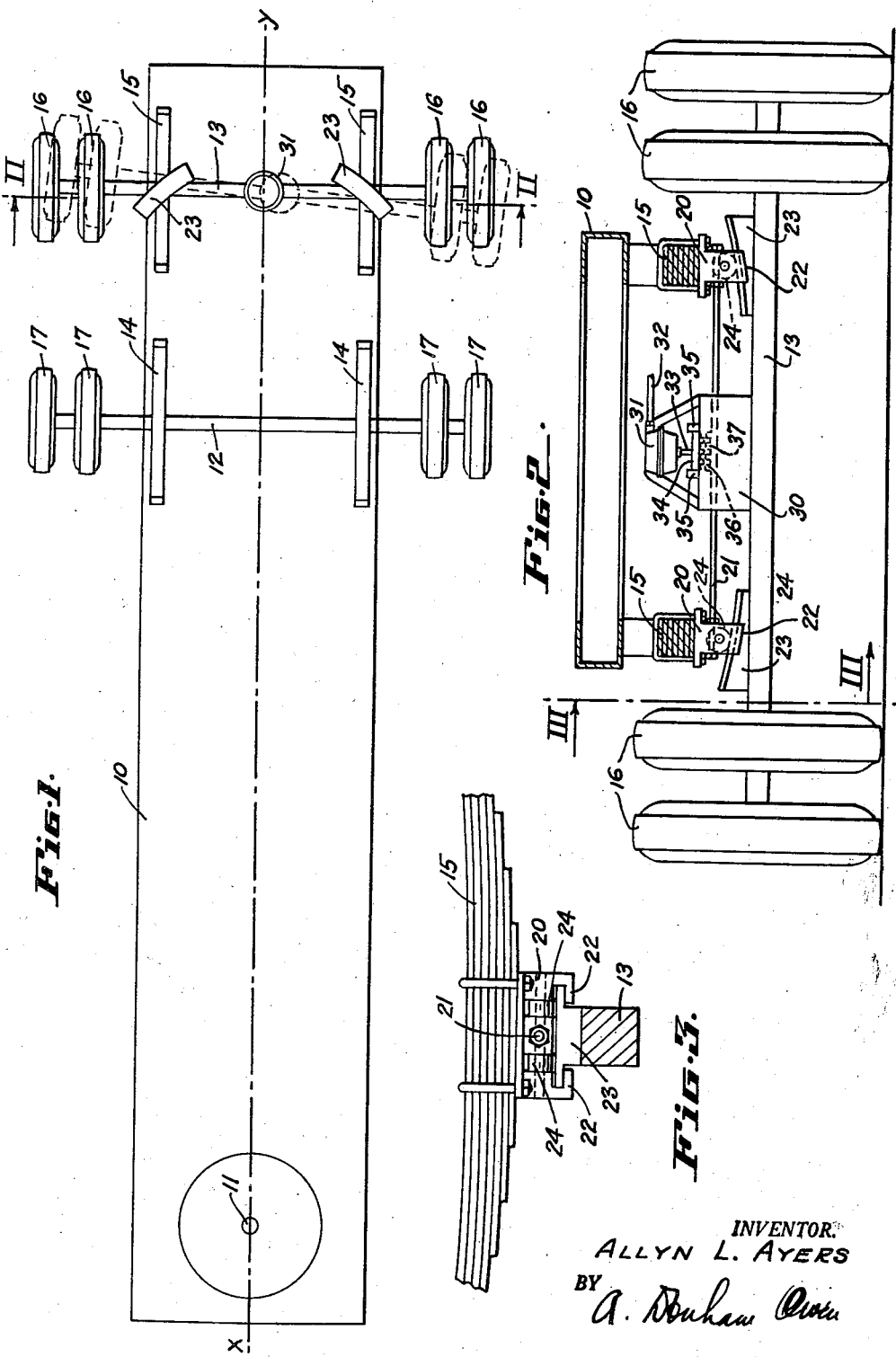

2,284,245

UNITED STATES PATENT OFFICE 2,284,245

MULTIPLE AXLE MOUNTING FOR TRAILERS

Allyn L. Ayers, Oakland, Calif.

Application April 7, 1941, Serial No. 387,117

5 Claims. (Cl. 280—80)

My invention relates to multiple axle vehicles.

In the operation of vehicles having multiple, adjacently mounted axles such as trucks, trailers or semi-trailers, a serious problem is encountered in the matter of tire wear, loss of power, increased fuel consumption and strain on the vehicle whenever its course of direction is changed to the right or left. This problem is magnified as the speed and load increase. An experienced truck driver is made immediately aware of this problem when driving the same vehicle on a dry pavement and on a wet pavement. On the wet pavement the lubrication of moisture permits the tires on the several axles to slide when a turn is being made and the vehicle handles and responds in an entirely different manner than when operated on a dry pavement. In the latter case the friction of the tires on the pavement is at its maximum and the driver is aware of the sliding of the tires and the slower response of the vehicle due to a change in direction. In practice a truck loses at least ten percent of its power and rolling speed on turns due to this friction.

My invention has for one of its objects to mount these tandem or multiple adjacent axles so that the wheels can adjust themselves to follow substantially the wheels on the fixed axle, or at least to assume a position substantially at right angles to the radius of the turn being made.

Another object of my invention is to include a positive lock on the movable axle or axles to hold them in any selected position when reversing the movement of the vehicle.

Another object of my invention is to provide a multiple axle vehicle having wheels rotatably mounted on each axle and with one of the axles secured substantially in right-angular position relative to the fore and aft line of the vehicle with means for mounting another of the axles for sidewise shiftable movement, said means including arcuate angularly set inclined guides whereby as the axle shifts to one side or the other, its angular relation with the fore and aft line of the vehicle changes from a right angle.

One feature of my invention is the mounting of the one or more tandem axles in slidable relation with respect to the springs so that as the fore and aft line of the vehicle changes direction the axles so mounted will shift their position relative to the fixed axle. Preferably this slidable means will cause the axle or axles so mounted to change its or their angular relation to said fore and aft line so as to position the wheels to follow substantially in the path of the wheels on the fixed axle or on a generally similar radius. Sometimes this following may not be possible, but in general the sidewise shifting of the movable axle or axles accompanied by their angular shift from a right angle position relative to the fore and aft line will give this effect.

My invention is equally applicable to the axles of a railroad truck, in which case the center pin is eliminated and each axle is mounted on angularly set slide blocks.

Other objects and advantages of my invention will become apparent from the following drawing and description and it is not my intention to have the claims confined to the structure described here for the purposes of illustrating my invention.

In the drawing:

Fig. 1 represents a plan view of a semi-trailer;

Fig. 2 represents a rear elevational view thereof on the line II—II of Fig. 1;

Fig. 3 represents a cross-sectional end view on the line III—III of Fig. 2.

While I have illustrated my invention in connection with a semi-trailer having a pair of adjacently mounted axles, it has equal application to vehicles having three or even more adjacently mounted axles as well as application to axles on a truck, or a trailer.

In the drawing, 10 denotes the frame of a semi-trailer and 11 the fifth wheel thereof. The semi-trailer is supported by axles 12 and 13. The frame is suspended over these axles by means of the usual springs 14 and 15. The details of radius rods, brake connections, etc., have been omitted for purposes of clarity in describing my invention.

In general it may be said that the axle 12 at all times is substantially at a right angle position relative to the fore and aft line X—Y of the vehicle. It may vary a few degrees as the vehicle is unevenly loaded or as a protuberance from the road causes one side to be lifted higher than the other. In general, however, this axle maintains a substantially right-angular position when the vehicle is moving straight ahead or is making a turn.

If axle 13 were also mounted to retain a right angular position with respect to the fore and aft line X—Y, as in the prior art, the inherent effect of making a turn with the vehicle would be to cause the tires 16 to slide over the road as the semi-trailer frame pivoted on the tires 17, or the effect might be for the tires 16 as well as the tires 17 to slide in frictional engagement with the road in permitting the turn to be made. Which pair of tires must slide to accommodate such a turn will depend upon which axle is most heavily loaded and whether the frictional coefficient of the pavement under each pair of tires is the same. Regardless of which tires slide, great loss in power, fuel and tire wear ensues.

My invention seeks to minimize and in many cases to eliminate the necessity for any sidewise sliding of the tires when the vehicle changes direction to the right or left. This I achieve by mounting axle 13 so that it is free to slide laterally and also by having the mounting so that as it slides laterally it also changes its angular relation with respect to the fore and aft line X—Y. Referring to Fig. 1 and assuming that the tractor attached to the semi-trailer at 11 has turned in a left-hand direction, the effect on axle 13 is shown by the dotted line position.

Fig. 2 shows the details of mounting of axle 13 so that it is free to shift relative to springs 15 and spring pads 20, which are connected together by a spacing bar 21. The spring pads 20 are constructed with extensions 22 which engage the underside of T members 23 secured to axle 13. These T members are preferably arcuate in shape, the arc conforming to the desired angular displacement axle 13 is to assume while a turn is being made. The arcuateness of members 23 and their relative setting on axle 13 will vary, depending on how close axle 13 is mounted with relation to axle 12. If the radii of the arcuate members 23 intersect at a point substantially midway between axles 12 and 13, the wheels 16 on the latter will follow in the path of the wheels 17.

To facilitate the sliding of pads 20 on the members 23, suitable rollers 24 may be secured in the pads 20.

Also, when making a turn it is an advantage to effect a slight shift in the center of gravity, such as by tilting the body and frame of the vehicle. My invention lends itself to this by having the members 23 higher at their outside end than at their inner end. While I have illustrated this inclined form of member 23, the invention functions with members 23 which are substantially parallel with axle 13.

When it becomes necessary for the driver of a truck trailer or semi-trailer to reverse the direction of movement of the vehicle, it is desirable to lock the shiftable axles such as 13 so that they do not change position once the reversing has begun. To accomplish this I provide a member 30 secured to axle 13. Mounted on member 30 is any suitable actuating means such as the vacuum or power actuator 31 adapted to be energized through the connection 32 from a suitable control mounted on the tractor or automatically actuated whenever the gear shift lever is placed in reverse. The actuator rod 33 moves the locking member 34 in suitable guides 35. Locking member 34 has suitable teeth 36 to engage with stops 37 attached to or integral with spacing bar 21. When the locking member 34 is in engagement with stops 37, axle 13 is held against shifting on its members 23.

An experienced operator, prior to reversing his vehicle, and locking axle 13, can shift the semi-trailer frame into a position that will cause axle 13 to assume a position relative to axle 12 which will place the tires 16 and 17 in position to roll with substantially no sidewise sliding on the pavement. When the operator has the vehicle in this position lock 34 is engaged and the vehicle can then be backed.

This lock is also useful under certain exceptional conditions when the vehicle is on a steeply inclined road surface. The operator engages the lock so the shiftable axle will not move out of alignment with the fixed axle.

While I have shown a T form for member 23, other forms of members can be used which will permit relative sliding between the spring pads 20 and axle 13. Likewise as to the locking mechanism, instead of a vacuum or power actuated unit, an electrically actuated solenoid might be substituted.

What I claim is:

1. In a vehicle: a frame; supporting means for the frame including tandem fixed and tracking axles; arcuate bearing pads secured on the tracking axle adjacent its ends; other pads resting on said arcuate pads and movable with respect thereto; transversely spaced leaf springs interposed between said frame and said other pads and secured to said other pads; means guiding said tracking axle for swinging movement about a central vertical axis lying between said axles; means including a tie rod for connecting said other pads together; and means for locking the tie rod and tracking axle together to prevent swinging of said tracking axle during backing.

2. In a vehicle: a frame; supporting means for the frame comprising tandem axles and spring means interposed between the frame and axles; the forward axle being non-steering; bearing pads on the rear axle adjacent its ends; other pads reclining on said bearing pads and movable with respect thereto and associated with said spring means; means guiding said rear axle for swinging about a central vertical axis between said axles; means including a tie rod connecting said other pads together above said axle, and controllable means for locking the tie rod and rear axle together to prevent swinging of the latter during backing.

3. In a vehicle: a frame; supporting means for the frame including tandem, fixed and tracking axles; arcuate bearing pads secured on the tracking axle adjacent its ends; other pads carried by the frame and resting on said bearing pads and movable with respect thereto; means guiding said tracking axle for swinging movement about a center intermediate the fixed and tracking axles; means including a tie rod for connecting said other pads together, and controllable means for locking the tie rod and rear axle together to prevent swinging of said rear axle during backing.

4. In a vehicle: a frame; supporting means for the frame comprising tandem axles of which the forward axle is non-steering, bearing pads on the rear axle adjacent its ends, other pads carried by the frame and riding on said bearing pads and movable with respect thereto; means guiding said rear axle for swinging about a central vertical axis between the axles; means including a tie rod for connecting said other pads together, and controllable means for locking the tie rod and rear axle together to prevent swinging of said rear axle during backing.

5. In a vehicle: a frame; supporting means for the frame including tandem, fixed and tracking axles; arcuate bearing pads secured on the tracking axle adjacent its ends; other pads carried by the frame and resting on said bearing pads and movable with respect thereto; and means guiding said tracking axle for swinging movement about a center intermediate the fixed and tracking axles; said bearing pads being outwardly and upwardly inclined for the purpose of elevating one or the other of said other pads when the vehicle is making a turn.

ALLYN L. AYERS.